United States Patent

Krull et al.

(10) Patent No.: US 6,509,424 B1
(45) Date of Patent: Jan. 21, 2003

(54) PROCESS FOR THE PREPARATION OF ETHYLENE COPOLYMERS, AND THEIR USE AS ADDITIVES TO MINERAL OIL AND MINERAL OIL DISTILLATES

(75) Inventors: Matthias Krull, Oberhausen; Werner Reimann, Frankfurt; Wilhelm Zoller; Heinz Dieter Bühnen, both of Oberhausen; Gerhard Bettermann, Vörde, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/207,219

(22) Filed: Dec. 8, 1998

(30) Foreign Application Priority Data

Dec. 9, 1997 (DE) .......................................... 197 54 555

(51) Int. Cl.$^7$ .......................... C08F 2/02; C08F 210/02; C08F 2/00
(52) U.S. Cl. .......................... 526/64; 526/66; 526/327; 526/328.5; 526/329.7; 526/330; 526/332; 526/348; 526/352
(58) Field of Search ........................... 526/64, 66, 348, 526/352, 327, 330, 328.5, 329.7

(56) References Cited

U.S. PATENT DOCUMENTS

| | | | |
|---|---|---|---|
| 4,211,534 A | | 7/1980 | Feldman |
| 4,617,366 A | | 10/1986 | Gloriod et al. |
| 4,670,516 A | | 6/1987 | Sackmann et al. |
| 4,788,265 A | | 11/1988 | Pfleger et al. |
| 4,804,794 A | * | 2/1989 | Ver Strate ................ 585/12 |
| 4,985,048 A | | 1/1991 | Wirtz et al. ............... 44/394 |
| 5,186,720 A | | 2/1993 | Feustel et al. |
| 5,200,484 A | * | 4/1993 | Reimann ................ 526/331 |
| 5,254,652 A | | 10/1993 | Reimann et al. |
| 5,376,740 A | | 12/1994 | Pfleger et al. |
| 5,391,632 A | | 2/1995 | Krull et al. |

FOREIGN PATENT DOCUMENTS

| | | | |
|---|---|---|---|
| CA | 1271895 | | 7/1990 |
| CA | 2204934 | | 11/1997 |
| DE | 2403516 | | 8/1975 |
| DE | 19620118 | | 10/1997 |
| EP | 0099646 | | 2/1984 |
| EP | 0153176 | | 8/1985 |
| EP | 0154177 | | 9/1985 |
| EP | 0174244 | | 3/1986 |
| EP | 0203554 | | 12/1986 |
| EP | 0245773 | | 11/1987 |
| EP | 0271738 | | 6/1988 |
| EP | 0413279 | | 2/1991 |
| EP | 0493769 | | 7/1992 |
| EP | 0575873 | | 12/1993 |
| EP | 0606055 | | 7/1994 |
| EP | 0648257 | | 4/1995 |
| EP | 0649445 | | 4/1995 |
| GB | 1 443 394 | * | 7/1976 |

OTHER PUBLICATIONS

Derwent Abstract: Buhnen et al., DE 364063, Jun. 1988.*

"Comb–Like Polymers—Structure and Properties," N.A. Plate and V.P. Shibaev, J. Polymer Sci.: Macromolecular Revs. 1974, vol. 8, pp. 117–253.

"New Laboratory Test for Predicting Low–temperature Operability of Diesel Fules," T. Coley, L.F. Ruthishauser, and H.M. Ashton, Journal of the Institute of Peteroleum, vol. 52, No. 510, Jun. 1966, pp. 173–185.

* cited by examiner

*Primary Examiner*—Fred Zitomer
(74) *Attorney, Agent, or Firm*—Susan S. Jackson; Scott E. Hanf

(57) ABSTRACT

The invention relates to a process for the preparation of terpolymers of ethylene and at least 2 further olefinically unsaturated compounds by polymerization in a tubular reactor fitted with at least one side branch, wherein the fresh monomer components, which are introduced into the tubular reactor via the reactor inlet (the primary stream) or via the side branch or side branches (secondary stream or secondary streams), in each of the streams contain ethylene and at most one further olefinically unsaturated compound.

11 Claims, No Drawings

PROCESS FOR THE PREPARATION OF ETHYLENE COPOLYMERS, AND THEIR USE AS ADDITIVES TO MINERAL OIL AND MINERAL OIL DISTILLATES

FIELD OF THE INVENTION

The present invention relates to a process for the preparation of terpolymers of ethylene, one or more vinyl esters or acrylates, and further olefinically unsaturated compounds, and to the use of the resultant copolymers for improving the cold-flow properties of mineral oils and mineral oil distillates.

DESCRIPTION OF THE RELATED ART

Crude oils and middle distillates obtained by distillation of crude oils, such as gas oil, diesel oil or heating oil, contain, depending on the origin of the crude oils, various amounts of n-paraffins, which, when the temperature is reduced, crystallize out as platelet-shaped crystals and in some cases agglomerate with inclusion of oil. This crystallization and agglomeration causes an impairment of the flow properties of the oils or distillates, which can result in problems during the recovery, transport, storage and/or use of the mineral oils and mineral oil distillates. During transport of mineral oils through pipelines, the crystallization phenomenon can cause deposits on the walls of the pipes, especially in winter, and in individual cases, for example during stoppage in a pipeline, can even cause complete blocking thereof. During storage and further processing of the mineral oils, it may furthermore be necessary in winter to store the mineral oils in heated tanks. In the case of mineral oil distillates, the crystallization may result in blockage of the filters in diesel engines and furnaces, preventing reliable metering of the fuels and in some cases causing complete interruption of the supply of the fuel or heating medium.

In addition to the classical methods of eliminating the crystallized paraffins (thermal, mechanical or using solvents), which merely involve removal of the precipitates which have already formed, recent years have seen the development of chemical additives (so-called flow improvers), which, by interacting physically with the precipitating paraffin crystals, result in their shape, size and adhesion properties being modified. The additives act as additional crystal nuclei and in some cases crystallize with the paraffins, resulting in an increased number of relatively small paraffin crystals having a modified crystal shape. The modified paraffin crystals have a lower tendency toward agglomeration, so that the oils to which these additives have been added can still be pumped and/or processed at temperatures which are frequently more than 20° lower than in the case of oils containing no additives.

Typical flow improvers for mineral oils and mineral oil distillates are copolymers and terpolymers of ethylene with carboxylates of vinyl alcohol, esters of acrylic or methacrylic acid and/or olefins.

EP-A-0 493 796 discloses terpolymers consisting of ethylene, 5–35% by weight of vinyl acetate and 1–25% by weight of vinyl neononanoate or neodecanoate, a process for their preparation, and their use as flow improvers for middle distillates.

DE-A-19 620 118 discloses terpolymers of ethylene, vinyl esters and 4-methylpentene which have improved solubility, a process for their preparation, and additive concentrates having a lowered inherent pour point prepared therefrom.

EP-A-0 203 554 discloses the use of terpolymers comprising, in addition to ethylene, from 0.5 to 20% by weight of diisobutylene and from 20 to 35% by weight of vinyl acetate (based on the terpolymer) and having a mean molecular weight of from 500 to 10,000, as additives for mineral oils and mineral oil distillates.

EP-A-0 099 646 discloses terpolymers having molecular weights of from 1500 to 5500 which comprise ethylene, from 10 to 20% by weight of vinyl acetate and from 3 to 15% by weight of an isoolefin and which contain, per 100 methylene groups, from 6 to 15 methyl groups which do not originate from the vinyl acetate.

EP-A-0 648 257 discloses terpolymers made from ethylene and 2 vinyl esters carrying acid radicals having a maximum of 8 carbon atoms, as constituents of a fuel oil composition.

EP-A-0 649 445 discloses terpolymers made from ethylene and two vinyl esters and/or acrylates in a proportion of up to 10 mol%, where the esters carry side chains having a maximum of 8 carbon atoms, as a constituent of fuel oil compositions.

EP-A-0 271 738 discloses a process for the preparation of copolymers of ethylene and esters of vinyl alcohol, acrylic acid or methacrylic acid by polymerization of monomer streams of different quantitative composition in a tubular reactor, and the use of these copolymers as flow improvers.

However, the terpolymers prepared by the prior-art process (EP 271 738) do not have the properties that would be expected of them on the basis of their monomer composition. For example, the terpolymers prepared in this way frequently impair the filterability of the oils in which they are present or their effectiveness is in many cases unsatisfactory. For example, the terpolymers of EP-A-0 493 796 have very good solubility, but they are ineffective in certain oils. The products prepared by the process of EP-A-0 271 738 have improved effectiveness, but impair the filterability of the oils to which they have been added.

The object was therefore to find a new process for terpolymerization which gives terpolymers whose properties can be controlled better via the specific properties of the various monomers.

SUMMARY OF THE INVENTION

Surprisingly, it has been found that improved terpolymers made from ethylene and at least two further comonomers can be obtained if the terpolymerization is carried out in a tubular reactor with a side branch and the fresh comonomers are fed in separately from one another via different reactor inlets.

The olefinically unsaturated compounds which make up the further comonomers are preferably vinyl esters, acrylates, methacrylates, alkyl vinyl ethers and/or alkenes.

The vinyl esters are preferably those of the formula 1

in which $R^1$ is $C_1$- to $C_{30}$-alkyl, preferably $C_1$- to $C_{16}$-alkyl, especially $C_1$- to $C_{12}$-alkyl.

In a further preferred embodiment, $R^1$ is a neoalkyl radical having 7 to 11 carbon atoms, in particular having 8, 9 or 10 carbon atoms. Suitable vinyl esters include vinyl acetate, vinyl propionate, 2-ethylhexanoic acid vinyl ester, vinyl laurate, vinyl neononanoate, vinyl neodecanoate and vinyl neoundecanoate.

The acrylates are preferably those of the formula 2

in which $R^2$ is hydrogen or methyl and $R^3$ is $C_1$- to $C_{30}$-alkyl, preferably $C_1$- to $C_{16}$-alkyl, especially $C_1$- to $C_{12}$-alkyl. Suitable acrylates include methyl acrylate, methyl methacrylate, ethyl acrylate and 2-ethylhexyl acrylate.

The alkyl vinyl ethers are preferably compounds of the formula 3

$$CH_2=CH-OR^4 \tag{3}$$

in which $R^4$ is $C_1$- to $C_{30}$-alkyl, preferably $C_1$- to $C_{16}$-alkyl, especially $C_1$- to $C_{12}$-alkyl.

The alkenes are preferably monounsaturated hydrocarbons having 3 to 30 carbon atoms, in particular 4 to 16 carbon atoms, especially 5 to 12 carbon atoms. Suitable alkenes include isobutylene, diisobutylene, 4-methylpentene, hexene, octene and norbornene.

Particular preference is given to terpolymers in which one of the radicals $R^1$, $R^3$ and $R^4$ is $C_1$- or $C_2$-alkyl and the other radical $R^1$, $R^3$ or $R^4$ is $C_4$- to $C_{16}$-alkyl, in particular $C_6$- to $C_{12}$-alkyl or an alkene.

DESCRIPTION OF THE PREFERRED EMBODIMENTS

In a preferred embodiment of the invention, the fresh monomer components are introduced in the main stream and in a secondary stream. In the main stream, ethylene is introduced as a mixture with one of the two further comonomers. In the secondary stream, ethylene is introduced as a mixture with the other comonomer.

In a further preferred embodiment of the invention, the fresh monomer components are introduced in the main stream and in two secondary streams. In this embodiment, there are various preferred variants:

A) In the main stream, ethylene is introduced as a mixture with one of the two further comonomers. In each of the secondary streams, ethylene is introduced as a mixture with the other of the further comonomers. The proportion of the further comonomers in the secondary streams can be the same or different.

B) In the main stream, ethylene is introduced, in the first secondary stream, one of the further comonomers is introduced, and in the second secondary stream, the second of the further comonomers is introduced.

In a further preferred embodiment of the invention, the fresh monomer components are introduced in the main stream and in three secondary streams. In these cases, it is preferred to introduce a mixture of ethylene and a further comonomer via the primary stream and a secondary stream, and to introduce a mixture of ethylene and the other of the comonomers via the two further secondary streams. A particularly preferred embodiment comprises introducing a mixture of ethylene and a further comonomer in the primary stream and introducing a mixture of ethylene and the other comonomer in all three secondary streams. In a further embodiment, ethylene is introduced in the primary stream, a further comonomer is introduced in the first secondary stream and the other comonomer is introduced in the two remaining secondary streams.

Correspondingly, the terpolymerization can also be carried out in tubular reactors having 4 or more secondary streams.

It is preferred to introduce the comonomer of lower copolymerization factor in the primary stream. It is furthermore preferred to introduce the comonomer of higher boiling point in the primary stream.

In general, the residual monomers which are not consumed are recycled and reintroduced into the reactor. The reintroduction can take place, after the residual monomer mixture has been separated off, in the primary and/or secondary stream. It is preferably carried out in the secondary stream.

The polymerization is preferably carried out at pressures of from 50 to 400 MPa, preferably from 120 to 300 MPa, and at temperatures of from 150 to 350° C., preferably from 100 to 300° C. The polymerization initiators used are advantageously oxygen, hydroperoxides, peroxides and azo compounds in the form of a 1 to 30% strength by weight solution. Suitable solvents are, in particular, aliphatic hydrocarbons and hydrocarbon mixtures.

In the process according to the invention, at least two monomer streams of different composition are fed into the reactor. The first monomer stream (primary stream) is introduced into the reactor via the reactor inlet. At least one second monomer stream (secondary stream) is introduced into the reactor via at least one side branch. The term side branch is taken to mean any introduction point along the reactor via which monomers and/or polymerization auxiliaries, namely initiators and regulators, can be fed into the reactor.

In the primary stream, the comonomer content is preferably from 3 to 200 parts by weight, in particular from 7 to 100 parts by weight, per 100 parts by weight of ethylene.

The secondary stream preferably contains from 10 to 500 parts by weight, in particular from 20 to 300 parts by weight, of the further comonomer per 100 parts by weight of ethylene.

Preferred initiator contents in the primary stream are from 50 to 10,000 ppm by weight, preferably from 50 to 1000 ppm by weight, and those in the secondary stream are from 100 to 10,000 ppm by weight, preferably from 200 to 2000 ppm by weight, in each case based on the monomer mixture.

In order to set the molar mass, polymerization regulators are generally added to the primary and secondary streams. Depending on the type of regulator and the desired viscosity, which is a measure of the molar mass, the regulator concentration in the two streams is identical or different and is preferably from 0.05 to 20% by weight, based on the monomer mixture. Examples of regulators are hydrogen, saturated or unsaturated hydrocarbons, such as, for example, propane or propene, aldehydes, such as, for example, propionaldehyde, n-butyraldehyde or isobutyraldehyde, ketones such as, for example, acetone, methyl ethyl ketone, methyl isobutyl ketone or cyclohexanone, or alcohols, such as, for example, butanol. The primary stream preferably contains from 0.1 to 10% by weight of regulator, and the secondary stream from 0.1 to 5% by weight of regulator, based on the monomer mixture.

In general, approximately equal volumes of the monomer mixture are fed to the reactor inlet and the side branch or branches, i.e. the volume ratio between the primary and secondary stream is about 1:1. However, it is entirely possible to use different volume ratios. It has proven successful to maintain a ratio in the range from 1:0.2 to 5 (in parts by vol.), in particular from 1:0.3 to 3, between the primary and secondary streams.

The secondary stream can be introduced into the reactor via a single side branch or in sub-streams via a plurality of side branches. It is preferred to use from 1 to 3 sub-streams, in particular 3 sub-streams.

The amount of secondary stream component introduced into the reactor via the individual side branches depends on the temperature range, i.e. the maximum and minimum temperatures, to be observed in the reactor.

The ethylene terpolymers prepared by the process according to the invention contain from 15 to 55 parts by weight of comonomers per 100 parts by weight of ethylene. In order to achieve this composition in the polymer, it is necessary to employ, under the reaction conditions selected, comonomer mixtures which take into account the copolymerization parameters of the comonomers employed and contain in total (i.e. as the sum of the contents in the primary and secondary streams) from about 2 to 40% by weight of further comonomers.

The ethylene copolymers obtained in accordance with the invention generally have a viscosity, measured at 140° C. using a rotational viscometer (for example from Haake) in accordance with EN 3219, of between 30 and 10,000 mPas, preferably from 50 to 5,000 mPas, in particular from 50 to 1000 mPas. The viscosity is adjusted in a known manner by adding polymerization regulators to the monomer mixture.

The terpolymers according to the invention contain methyl groups originating on the one hand from the structure of the comonomer molecules, such as, for example, $CH_3$ groups from the vinyl neocarboxylates, terminal $CH_3$ groups in the alkyl radicals or olefins, and on the other hand from the ethylene polymerization mechanism. The number of methyl groups is determined, for example, by $^1$H-NMR spectroscopy. The terpolymers preferably contain from 2 to 15, in particular from 3 to 11, $CH_3$ groups per 100 $CH_2$ groups with the exception of the $CH_3$ groups originating from vinyl acetate as the vinyl ester.

The polymerization is preferably carried out in tubular reactors known per se having a length:diameter ratio in the range from about 10,000:1 to 100,000:1. The lower limit for this ratio is preferably about 20,000:1, in particular about 25,000:1. The upper limit is preferably about 80,000:1, in particular about 60,000:1. Tubular reactors usually have a length of from about 200 to 4000 m, the lower limit preferably being about 250 m and the upper limit preferably being about 3000 m, in particular 2000 m.

The temperature is regulated in accordance with the prior art by cooling the tubular reactor and through the secondary stream introduced into the reactor via at least one side branch. The temperature of the secondary stream is from 0 to 60 C. The points of introduction of the secondary stream into the tubular reactor are selected so as to form 2 to 4 reaction zones in which the reaction mixture has approximately the same residence time.

The polymers prepared according to the invention are added to mineral oils or mineral oil distillates in the form of solutions or dispersions comprising from 1 to 90% by weight, in particular from 10 to 80% by weight (based on the solution) of the polymers. Suitable solvents are aliphatic and/or aromatic hydrocarbons or hydrocarbon mixtures, for example gasoline fractions, kerosene, decane, pentadecane, toluene, xylene, ethylbenzene or commercial solvent mixtures, such as solvent naphtha, Shellsol AB, Solvesso 150, Solvesso 200 and Exxsol, Isopar and Shellsol D grades. Kerosene is particularly suitable. Mineral oils and mineral oil fractions whose rheological properties have been improved by the novel polymeric compounds preferably contain from 0.001 to 2% by weight, in particular from 0.005 to 0.5% by weight, of copolymer.

The copolymers according to the invention can furthermore be used, as flow improvers, in the form of mixtures consisting of polymers of the claimed type, but with different qualitative and/or quantitative composition and/or different viscosity (measured at 140° C.). The mixing ratio (in parts by weight) of the copolymers can be varied over a broad range and can be, for example, from 20:1 to 1:20, preferably from 10:1 to 1:10. In this way, the flow improvers can be matched specifically to individual requirements.

In order to produce additive packages for specific problem solutions, the polymers prepared in accordance with the invention can also be employed together with one or more oil-soluble coadditives which, even on their own, improve the cold-flow properties of crude oils, lubricating oils or fuel oils. Examples of such coadditives are copolymers containing vinyl acetate or terpolymers of ethylene, polar compounds which effect paraffin dispersal (paraffin dispersants) and comb polymers. For example, mixtures of the terpolymers according to the invention with copolymers comprising from 10 to 40% by weight of vinyl acetate and from 60 to 90% by weight of ethylene have proven highly successful.

In a further embodiment of the invention, the terpolymers prepared in accordance with the invention are employed, as a mixture with ethylene-vinyl acetate-vinyl neononanoate terpolymers or ethylene-vinyl acetate-vinyl neodecanoate terpolymers, for improving the flow properties of mineral oils or mineral oil distillates. The terpolymers of vinyl neononanoate or of vinyl neodecanoate contain, besides ethylene, from 10 to 35% by weight of vinyl acetate and from 1 to 25% by weight of the particular neo compound. The mixing ratio of the terpolymers prepared in accordance with the invention with the above-described ethylene-vinyl acetate copolymers or the terpolymers of ethylene, vinyl acetate and the vinyl esters of neononanoic or neodecanoic acid is (in parts by weight) from 20:1 to 1:20, preferably from 10:1 to 1:10.

For use as flow improvers, the terpolymers prepared in accordance with the invention can furthermore be employed as a mixture with paraffin dispersants. These additives reduce the size of the paraffin crystals and make sure that the paraffin particles do not separate out, but instead remain colloidally dispersed with significantly reduced sedimentation effort. Paraffin dispersants which have proven successful are oil-soluble polar compounds containing ionic or polar groups, for example amine salts and/or amides obtained by reaction of aliphatic or aromatic amines, preferably long-chain aliphatic amines, with aliphatic or aromatic mono-, di-, tri- or tetracarboxylic acids or their anhydrides (cf. U.S.Pat. No. 4,211,534). Other paraffin dispersants are copolymers of maleic anhydride and α,β-unsaturated compounds, which can, if desired, be reacted with primary monoalkylamines and/or aliphatic alcohols (cf. EP 0 154 177), the products of the reaction of alkenylspirobislactones with amines (cf. EP 0 413 279), and, according to EP 0 606 055, products of the reaction of terpolymers based on α,β-unsaturated dicarboxylic anhydrides, α,β-unsaturated compounds and polyoxyalkylene ethers of lower unsaturated alcohols.

Finally, in a further variant of the invention which has proven successful, the terpolymers prepared in accordance with the invention are used as flow improvers together with comb polymers. These are taken to mean polymers in which hydrocarbon radicals having at least 8, in particular at least 10, carbon atoms are bonded to a polymer backbone. These are preferably homopolymers whose alkyl side chains contain at least 8 and in particular at least 10 carbon atoms. In the case of copolymers, at least 20%, preferably at least 30%, of the monomers have side chains (cf. Comb-like Polymers-Structure and Properties; N.A. Platé and V.P. Shibaev, J. Polym. Sci. Macromolecular Revs. 1974, 8, 117 ff). Examples of suitable comb polymers are fumarate/vinyl acetate copolymers (cf. EP 0 153 176 Al), copolymers made from a $C_6$- to $C_{24}$-α-olefin and a N—$C_6$- to $C_{22}$-alkylmaleimide (cf. EP 0 320 766), further esterified olefin/maleic anhydride copolymers, polymers and copolymers of α-olefins and esterified copolymers of styrene and maleic anhydride.

For example, comb polymers can be described by the formula

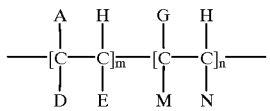

in which

A is R', COOR', OCOR', R"—COOR' or OR';

D is H, $CH_3$, A or R";

E is H or A;

G is H, R", R"—COOR', an aryl radical or a heterocyclic radical;

M is H, COOR", OCOR", OR" or COOH;

N is H, R", COOR", OCOR, COOH or an aryl radical;

R' is a hydrocarbon chain having 8–50 carbon atoms;

R" is a hydrocarbon chain having 1 to 10 carbon atoms;

m is a number between 0.4 and 1.0, and n is a number between 0 and 0.6.

The mixing ratio (in parts by weight) of the terpolymers prepared in accordance with the invention with paraffin dispersants or comb polymers is in each case from 1:10 to 20:1, preferably from 1:1 to 10:1.

The polymers according to the invention improve the flow properties both of mineral oils, oils of vegetable or animal origin and of mineral oil distillates. They do not impair the filterability of the oils to which they have been added, even above the cloud point. The term mineral oils is taken to mean, in particular, crude oils, distillation residues and mineral oil distillates. The term mineral oil distillates is taken to mean hydrocarbon fractions having a boiling point of between about 150 and 450° C. These include, for example, petroleum, light heating oils and diesel fuel. Of particular importance are the middle distillates such as heating oil EL and diesel fuel.

The polymers can be used alone or together with other additives, for example with other pour point depressants or dewaxing aids, with corrosion inhibitors, antioxidants, sludge inhibitors, lubricity additives, dehazers and additives for lowering the cloud point.

The effectiveness of the polymers according to the invention as flow improvers is illustrated in greater detail by the examples below.

The effectiveness of the copolymers investigated for improving the flow properties is described with reference to the "cold filter plugging point test" (CFPP test). The test is carried out in accordance with EN 116. It has also been published in J. Inst.

Petro., Vol. 52, June 1966, pages 173 to 185. Various mineral oil distillates, Test Oils 1 to 3, are used for the testing.

EXAMPLES

Example 1

The polymerization is carried out in a tubular reactor with a length of 500 m and a mean diameter of 30 mm with 3 side branches at 210° C. and 200 MPa using peroxides dissolved in a hydrocarbon mixture as initiator. The primary gas stream is fed to the reactor inlet; the secondary gas stream is introduced into the reactor via the three side branches in the weight ratio 1:1.3:1.6. The points of introduction of the monomer mixture are selected so as to form four reaction zones in which the reaction mixture has approximately the same residence time. The polymerization mixture is decompressed via a high-pressure separator and a low-pressure separator, and the polymer is separated from unreacted monomer. The residual monomers and fresh ethylene are recompressed to the reaction pressure and fed back into the reactor distributed equally over the primary and secondary gas streams. Fresh vinyl neodecanoate is added in the primary stream; vinyl acetate and methyl ethyl ketone are metered into the secondary stream. The reaction temperature is established through metered addition of initiator.

| | |
|---|---|
| Ethylene: | 720 parts by weight |
| Vinyl acetate: | 605 parts by weight |
| Vinyl neodecanoate: | 192 parts by weight |
| Methyl ethyl ketone (MEK) | 92 parts by weight |

Example 2

The polymerization is carried out as described in Example 1 at 240° C. and 170 MPa using the following composition of the gas streams:

| | |
|---|---|
| Ethylene: | 1000 parts by weight |
| Vinyl acetate: | 642 parts by weight |
| Vinyl neodecanoate: | 158 parts by weight |
| Methyl ethyl ketone (MEK) | 80 parts by weight |

Example 3

The polymerization is carried out as described in Example 1 at 200° C. and 190 MPa with two feed points in the secondary gas stream. Vinyl neodecanoate is replaced by 4-methyl-1-pentene.

| | |
|---|---|
| Ethylene: | 1000 parts by weight |
| Vinyl acetate: | 642 parts by weight |
| 4-Methyl-1-pentene | 270 parts by weight |
| Methyl ethyl ketone (MEK) | 80 parts by weight |

Comparative Examples 1 and 2

The polymerization is carried out as described in Example 1 at 200° C. and 205 MPa with metering of the two comonomers into the secondary stream (as described in EP 271738):

| | Comp. Example 1 | Comp. Example 2 |
|---|---|---|
| Ethylene: | 900 parts by weight | 950 parts by weight |
| Vinyl acetate: | 418 parts by weight | 642 parts by weight |
| Vinyl neodecanoate | 132 parts by weight | 132 parts by weight |
| Methyl ethyl ketone (MEK) | 64 parts by weight | 64 parts by weight |

Comparative Example 3

The polymerization is carried out as described in Example 1 at 2050C. and 200 MPa, but with metering of all comonomers and the moderator into the return gas, producing primary and secondary gas streams having the same composition:

| | |
|---|---|
| Ethylene: | 1300 parts by weight |
| Vinyl acetate: | 725 parts by weight |
| Vinyl neodecanoate: | 259 parts by weight |
| Methyl ethyl ketone (MEK) | 96 parts by weight |

TABLE 1

Characterization of the additives (VAc = vinyl acetate; data in % by weight)

| | VAc | $V_{140}$ | Termonomer |
|---|---|---|---|
| Example 1 | 29.3% | 218 mPas | 9.4% VeoVa 10 |
| Example 2 | 31.7% | 270 mPas | 6.4% VeoVa 10 |
| Example 3 | 30.4% | 195 mPas | 4.7% 4-methylpentene |
| Comparison 1 | 27.0% | 124 mPas | 6.8 VeoVa |
| Comparison 2 | 34.3% | 383 mPas | 5.9 VeoVa |
| Comparison 3 | 31.0% | 120 mPas | 8.2 VeoVa |

Table 2: Characterization of the Test Oils

The boiling characteristics are determined in accordance with ASTM D-86, the CFPP value is determined in accordance with EN 116, and the cloud point is determined in accordance with ISO 3015.

|  | Test Oil 1 | Test Oil 2 | Test Oil 3 |
|---|---|---|---|
| Commencement of boiling | 184° C. | 182° C. | 199° C. |
| 20% | 258° C. | 236° C. | 247° C. |
| 30% | 271° C. | 253° C. | 263° C. |
| 90% | 329° C. | 357° C. | 355° C. |
| 95% | 344° C. | 375° C. | 374° C. |
| Cloud point | −5° C. | 2° C. | 2° C. |
| CFPP | −9° C. | 0° C. | −1° C. |
| (90–20)% | 71° C. | 121° C. | 108° C. |
| S content ppm | 365 | 1835 | 754 |

Solubility of the Terpolymers

The solubility behavior of the terpolymers is determined in the British Rail test as follows: 400 ppm of a dispersion of the polymer in kerosene at 22° C. are metered into 200 ml of the test oil at 22° C., and the mixture is shaken vigorously for 30 seconds. After storage for 24 hours at +3° C., the mixture is shaken for 15 seconds and then filtered at 30° C. in three 50 ml portions through a 1.6 µm glass fiber microfilter (Ø 25 mm; Whatman GFA, Order No.1820025). The three filtration times $T_1$, $T_2$ and $T_3$ are used to calculate the ADT value as follows:

$$ADT = \frac{(T_3 - T_1)}{T_2} \cdot 50$$

An ADT value of ≦15 is regarded as an indication that the gas oil will have satisfactory use properties in "normal" cold weather. Products having ADT values of >25 are referred to as non-filterable.

TABLE 3

Filterability of Test Oil 1 with additive

|  | ADT |
|---|---|
| Blank value (without additive) | 3.0 |
| Example 1 | 6.1 |
| Example 2 | 9.1 |
| Example 3 | 7.4 |
| Comparative Example 1 | 36 |
| Comparative Example 2 | 39 |
| Comparative Example 3 | 5.4 |

TABLE 4

CFPP effectiveness

| Ex. | Test Oil 2 | | | | Test Oil 3 | | | |
|---|---|---|---|---|---|---|---|---|
|  | 50 ppm | 100 ppm | 200 ppm | 300 ppm | 50 ppm | 100 ppm | 200 ppm | 300 ppm |
| 1 | −9 | −13 | −15 | −15 | −8 | −12 | −16 | −17 |
| 2 | −5 | −12 | −14 | −16 | −9 | −13 | −15 | −15 |
| 3 | −6 | −11 | −14 | −17 | −8 | −14 | −16 | −19 |
| Comp. | −7 | −11 | −13 | −16 | −10 | −12 | −13 | −18 |
| Comp. | −7 | −11 | −14 | −15 | −8 | −13 | −14 | −15 |
| Comp. |  | −2 | −12 | −14 | −1 | −2 | −12 | −4 |

List of Trade Names Used

| Solvent naphtha ® Shellsol AB ® Solvesso 150 | aromatic solvent mixtures having a boiling range of from 180 to 210° C. |
|---|---|
| ® Solvesso 200 | aromatic solvent mixture having a boiling range of from 230 to 287° C. |
| ® Exxsol | dearomatized solvents in various boiling ranges, for example ®Exxsol D60: 187 to 215° C. |
| ® ISOPAR (Exxon) | isoparaffinic solvent mixtures in various boiling ranges, for example ®ISOPAR L: 190 to 210° C. |
| ® Shellsol D | principally aliphatic solvent mixtures in various boiling ranges |

What is claimed is:

1. A process for the preparation of terpolymers of ethylene and at least 2 further monoolefinically unsaturated comonomers by polymerization in a single tubular reactor fitted with at least one side branch, wherein the fresh monomer components, initiator and optional regulator are introduced into the tubular reactor via the reactor inlet (the primary stream) or via the side branch or side branches (secondary stream or secondary streams), and wherein each of the streams contain ethylene and at most one different of said 2 further olefinically unsaturated comonomers.

2. The process as claimed in claim 1, wherein the comonomer content in the primary stream is from 3 to 200 parts by weight, per 100 parts by weight of ethylene, and the comonomer content in the secondary stream is from 10 to 500 parts by weight, per 100 parts by weight of ethylene.

3. The process as claimed in claim 1, wherein the initiator contents in the primary stream are from 50 to 10,000 ppm by weight, and the initiator contents in the secondary stream are from 100 to 10,000 ppm by weight, in each case based on the monomer mixture.

4. The process as claimed in claim 1, wherein a regulator is present and the regulator concentration in the primary stream and secondary streams is identical or different and is from 0.05 to 20% by weight, based on the.

5. The process as claimed in claim 4, wherein the regulator concentration in the primary stream is from 0.1 to 10% by weight and the regulator concentration in the secondary stream is from 0.1 to 5% by weight, based on the monomer mixture.

6. The process as claimed in claim 1, wherein the volume ratio of primary stream to secondary stream is from 1:0.2 to 5.

7. The process as claimed in claim 1, wherein one, two or three, secondary streams are used.

8. The process as claimed in claim 1, wherein the comonomers used are vinyl esters of the formula 1

$$CH_2{=}CH{-}OCOR^1 \qquad (1)$$

in which $R^1$ is $C_1$- to $C_{30}$-alkyl.

9. The process as claimed in claim 1, wherein the comonomers used are acrylates of the formula 2

$$CH_2{=}CR^2{-}COOR^3 \qquad (2)$$

in which $R^2$ is hydrogen or methyl and $R^3$ is $C_1$- to $C_{30}$-alkyl.

10. The process as claimed in claim 1, wherein the comonomers used are alkyl vinyl ethers of the formula 3

$$CH_2{=}CH{-}OR^4 \qquad (3)$$

in which $R^4$ is $C_1$- to $C_{30}$-alkyl.

11. The process as claimed in claim 1, wherein the comonomers used are monounsaturated hydrocarbons having 3 to 30.

* * * * *